(12) United States Patent
Ficery et al.

(10) Patent No.: US 8,265,981 B2
(45) Date of Patent: Sep. 11, 2012

(54) METHOD AND SYSTEM FOR IDENTIFYING A BUSINESS ORGANIZATION THAT NEEDS TRANSFORMATION

(75) Inventors: Kristin L. Ficery, Atlanta, GA (US); Jack E. Azagury, San Francisco, CA (US); Arthur R. Bert, Natick, MA (US); Michael K. Ostergard, Marietta, GA (US); Michael J. Harrison, San Mateo, CA (US); David S. St. Leger-Andrews, San Carlos, CA (US); John F. Engel, Evanston, IL (US); Susan Tomilo, Chicago, IL (US)

(73) Assignee: Accenture Global Services Limited, Dublin (IE)

( * ) Notice: Subject to any disclaimer, the term of this patent is extended or adjusted under 35 U.S.C. 154(b) by 992 days.

(21) Appl. No.: 12/167,008

(22) Filed: Jul. 2, 2008

(65) Prior Publication Data

US 2010/0004963 A1  Jan. 7, 2010

(51) Int. Cl.
*G06Q 10/00* (2012.01)
(52) U.S. Cl. .................... 705/7.29; 705/36 R
(58) Field of Classification Search .......... None
See application file for complete search history.

(56) References Cited

U.S. PATENT DOCUMENTS

| | | | |
|---|---|---|---|
| 6,591,232 B1* | 7/2003 | Kassapoglou | 703/2 |
| 7,376,610 B2* | 5/2008 | Schneider | 705/36 R |
| 7,409,303 B2* | 8/2008 | Yeo et al. | 702/60 |
| 7,426,499 B2* | 9/2008 | Eder | 706/20 |
| 7,558,757 B2* | 7/2009 | Conroy et al. | 705/38 |
| 2002/0046143 A1* | 4/2002 | Eder | 705/36 |
| 2005/0125322 A1* | 6/2005 | Lacomb et al. | 705/35 |

OTHER PUBLICATIONS

Dassisti M, 2005, An Hybrid Methodology for Performance Improvement of Manufacturing Processess Based on B.P.R. and T.Q.M., 18th International Conference of Production Research, pp. 1-6.*
Dassisti M, 2005, An Hybrid Methodology for Performance Improvement of Manufacturing Processess Based on B.P.R. and T.Q.M., 18th International Conference of Production Research, pp. 1-6.*
Morin Roger and Jarrell Sherry, 2001, Driving Shareholder Value, McGraw-Hill, pp. 108, 118, 149-151, and 330.*

* cited by examiner

*Primary Examiner* — Jonathan G Sterrett
*Assistant Examiner* — Stephen S Swartz
(74) *Attorney, Agent, or Firm* — Brinks Hofer Gilson & Lione

(57) ABSTRACT

A method and system for identifying a business organization that needs transformation is provided. In one implementation the method and system may include providing information, such as financial, marketing, and internal information, related to a business organization; determining from the information whether the business organization has had a performance trigger; adding the business organization to a list of transformation candidates if the determination identifies the business organization as having had a performance trigger; and displaying on a display device whether the business organization is a candidate for transformation.

40 Claims, 11 Drawing Sheets

▲ Cultural Assessment for
▲▲ ABC Company

| | Strongly disagree | Moderately disagree | Neutral | Moderately agree | Strongly agree | Unable to rate |
|---|---|---|---|---|---|---|
| 1. Being aggressive is a part of our corporate identity. | ○ | ○ | ○ | ○ | ⦿ | ○ |
| 2. Our processes and procedures are streamlined to ensure efficient communications and workflow. | ○ | ⦿ | ○ | ○ | ○ | ○ |
| 3. The ABC organization's shared values are an important aspect of team member performance evaluations. | ○ | ○ | ○ | ⦿ | ○ | ○ |
| 4. Sharing learnings with other groups or functions is a high priority in the ABC Company. | ⦿ | ○ | ○ | ○ | ○ | ○ |
| 5. In my workgroup, team members arrive on time to meetings, always come prepared and complete agreed-upon tasks. | ○ | ○ | ○ | ⦿ | ○ | ○ |
| 6. The ABC leadership team consistently models our shared values. | ○ | ○ | ○ | ○ | ⦿ | ○ |
| 7. People feel free to experiment and contribute new ideas and approaches even when it falls outside of their job description. | ⦿ | ○ | ○ | ○ | ○ | ○ |
| 8. The ABC leadership team consistently communicates the reason for important business decisions. | ○ | ○ | ○ | ⦿ | ○ | ○ |

Fig. 9

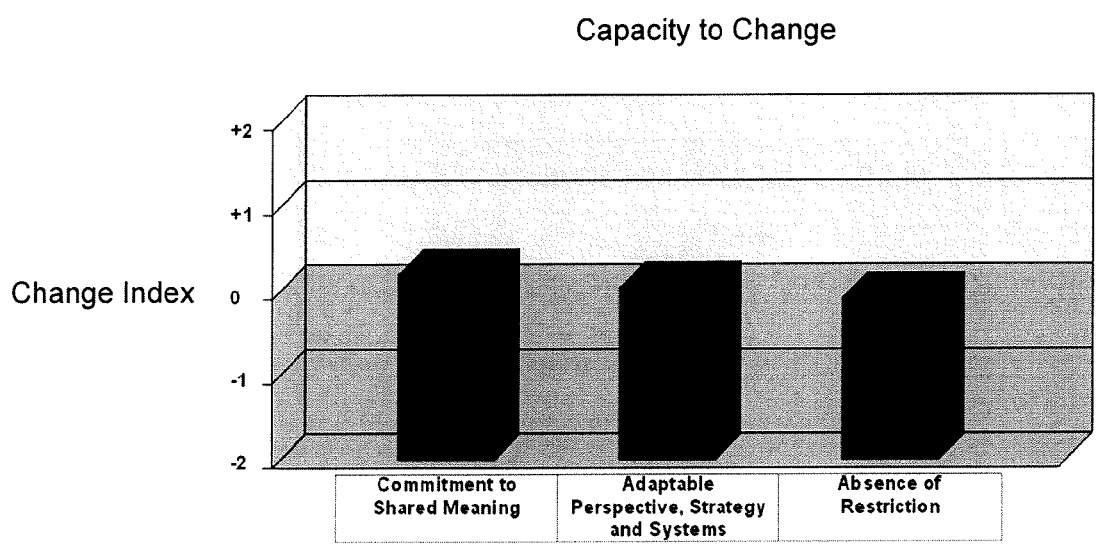

Fig. 10

METHOD AND SYSTEM FOR IDENTIFYING A BUSINESS ORGANIZATION THAT NEEDS TRANSFORMATION

BACKGROUND

1. Field of Invention

The present invention relates to a method and system for identifying transformation candidates and transforming a business organization.

2. Background Information

When executives of troubled companies fail to act in time or fail to act at all their company's performance may keep degrading until the company's market valuation drops suddenly and very publicly. This may happen to companies large and small. Most companies may experience a challenge that may be significant enough to require substantial changes to the way they conduct business.

There have always been businesses in trouble, and in response, companies are constantly undergoing some form of reorganization. However, in most cases the changes are merely tactical, mostly limited to region-specific or product-specific cost cutting programs. Many of these programs may be far from successful. One reason for this may be that the changes may not fundamentally realign or redesign the underlying business model. Another reason may be that in many cases companies may respond too late to the first signs of trouble. In other words, the changes may have been implemented after the company's valuation had substantially eroded. In some cases, the lag time between the beginning of the problems and the point of no return can stretch from 18 months to as long as four years. This may lull executives into thinking that although things are not great, there may be no crisis even though in reality there is a crisis.

Once a company begins its downward spiral in performance and resulting market valuation, the downward spiral may persists for years. Moreover, even where a struggling organization does stabilize, additional time may be needed to regain the trust of investors. This may be true even where the company can demonstrate rising cash flow, earnings recovery, fattening order books, and more. The trust of the capital markets may be lost and in some cases, it may never come back.

SUMMARY OF INVENTION

To address the problems outlined above, a method and system for identifying a business organization that requires transformation is provided. The method and system may include providing information, such as financial, marketing, and internal information, related to a business organization; determining from the information whether the business organization has had a performance trigger; adding the business organization to a list of transformation candidates if the determination identifies the business organization as having had a performance trigger; and displaying on a display whether the business organization is a candidate for transformation.

The performance trigger may correspond to a financial trigger, a market trigger, and/or an internal trigger, where the internal trigger may correspond to changes in internal conditions of the business organization. The financial trigger may correspond to a decline of 10% in the growth rate of the profitability and/or the cash flow of the business organization. The market trigger may correspond to changes in market conditions that have an adverse effect on the business organization that has had the performance trigger.

The financial information provided may include data related to a company's profitability and the profitability growth rate over time, revenue and a revenue growth rate over time, and cash flow and a cash flow growth rate over time.

The method and system for identifying the business organization that requires transformation may also include prioritizing the list of transformation candidates in a manner in which the company that is expected to receive the greatest net benefit from a transformation is displayed at the top of the list of transformation candidates. Prioritizing may be accomplished by first locating a business unit within an identified business transformation candidate that results in a decline in a shareholder value. This may be accomplished by determining actual costs of all investments for the identified business unit, discounted to a present value, using a cost of capital associated with the identified business units; estimating an economic value of the identified business unit by discounting an expected cash flow to a present value; and calculating a difference between the estimated economic value and the determined actual costs.

Next, the reason for the decline in the shareholder value is determined. The reason for the decline may be determined by evaluating:

a) the value gap between investor expectations and each transformation candidate's plans for shareholder value creation, b) whether investor expectations for future growth are low relative to industry peers, c) whether the transformation candidate's profitability is increasing over time, d) whether one or more entities within each transformation candidate suffers from declining revenues and lack of demand, and e) whether one or more entities of the transformation candidate suffers from poor competitive advantage due to cost or capital position.

Next the cost needed to transform the candidate so as to reduce the decline in shareholder value or set the company on a new growth trajectory is assessed. Higher priority may be given to transformation candidates that may benefit most from a transformation.

After the cost needed to transform is determined, the business organization may be transformed according to a transformation plan. The transformation plan may be displayed on a display.

BRIEF DESCRIPTION

FIG. 1 is an embodiment of a system for identifying companies that may be candidates for transformation in accordance with the present invention;

FIG. 2 schematically shows an embodiment of a trigger detection process to be used with the system of FIG. 1 in accordance with the present invention;

FIG. 3 is a chart showing an exemplary company experiencing a financial trigger;

FIG. 4 schematically shows an embodiment of a prioritizing process for prioritizing a list of transformation candidates to be used with the system of FIG. 1 in accordance with the present invention;

FIG. 9 is a sample of a survey that may be utilized to conduct the culture value analysis of FIG. 8;

FIG. 10 is a sample of a report that is output as a result of the culture value analysis of FIG. 8;

DETAILED DESCRIPTION OF THE INVENTION

Figure 1:
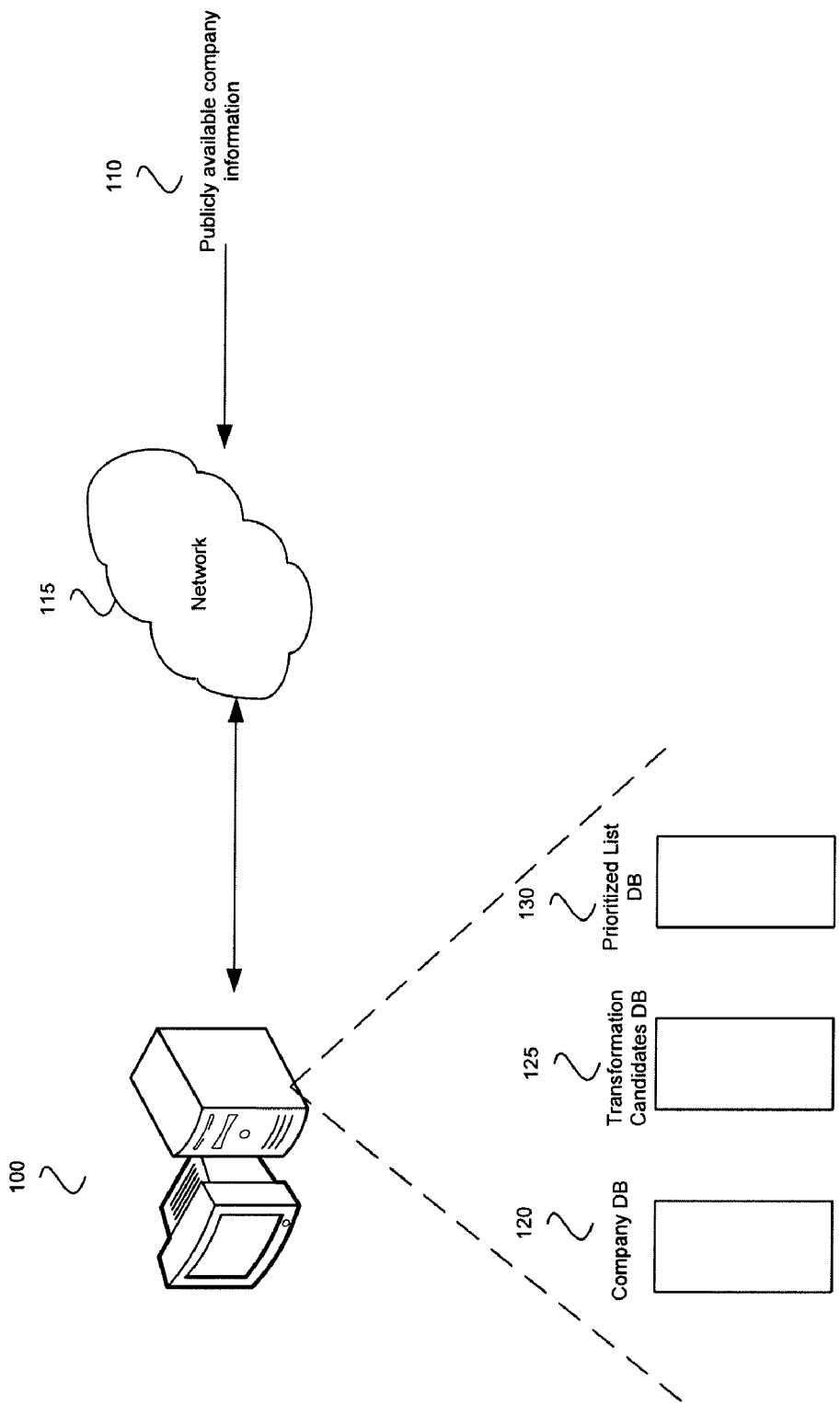

FIG. 1 is a system for identifying companies that may be candidates for transformation in accordance with an embodiment of the invention. As used herein, the terms company and business organization are synonymous with one another. Referring to FIG. 1 there is shown a processing computer 100, a stream of publicly available company information 110, and a network 115. Within the processing computer 100 there is shown a company database 120, a transformation candidate database 125, and a prioritized list of transformation candidates 130. The publicly available information 110 may be delivered to the processing computer 100 via the network 115. The publicly available information 110 may include financial information, market information, and/or internal information about various companies, such as Fortune 500 companies.

The financial information may include information related to each company's profitability and the growth rate of the profitability over time, revenue and the growth of the revenue over time, and cash flow and the growth of the cash flow over time.

The market information may include data that indicates whether industry players may be redefining the market or generating disruptive innovations. For each company, the market information may also indicate whether a company has the capability to respond and compete to the market changes, whether the company may be at risk of a takeover, whether there may be current or pending regulatory changes which may adversely affect the company's market positioning, and whether the company's current strategy and path may be adequate for market trends and realities.

The internal information may include information such as whether there has been a significant executive management change in a company and whether the new leadership may be looking to drive the company in a new direction. The Internal information may also indicate whether employee turnover and productivity may be below that of industry benchmarks and whether there may be cultural issues impacting marketplace success, whether there may have been a failure around a key success factor (e.g., pharmaceutical pipeline dries up, oil company operated in political unstable markets), and whether there may have been a change in ownership structure (e.g., public offering, privatization).

The publicly available company information 110 may be stored in a company database 120 in the processing computer 100. The processing computer 100 may then analyze the data in the company database 120 to determine whether the data indicates that a company may have experienced a performance trigger. A performance trigger may correspond to a financial, marketing, or internal event that evinces the need for a company to reorganize or transform itself. Companies that may have experienced a performance trigger may be referred to as transformation candidates and may be stored in the transformation candidate database 125. The transformation candidates may be displayed on a display coupled to the processing computer 100.

Additional information for prioritizing the transformation candidates may be communicated to the processing computer 100. The processing computer 100 may utilized this information to create the prioritized list of transformation candidates database 130. The information may be displayed on the display device coupled to the processing computer 100 as well. The companies with the highest priority may then be selected for transformation.

Figure 2:
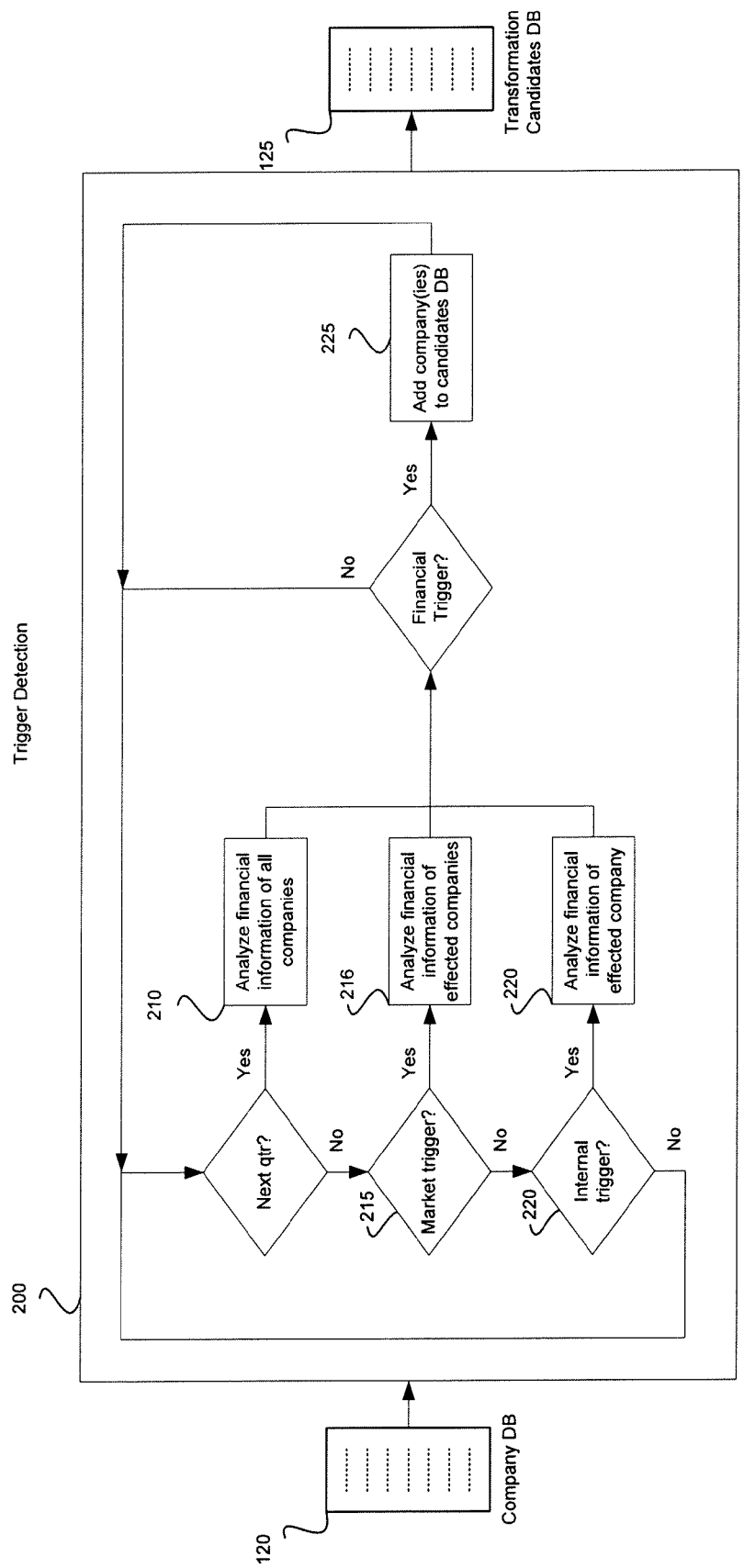

FIG. 2 is a flow diagram for identifying companies that may be candidates for transformation. The blocks described in FIG. 2 may be executed by the processing computer 100. Referring to FIG. 2, at block 200 information from the company database 120 may be analyzed to determine whether any company in the company database 120 may have experienced a performance trigger. In this regard, financial information stored of all the companies in the company database may be analyzed at block 210 on a periodic basis, such as every quarter, to determine whether any of the companies in the company database 120 may have experienced a financial trigger. That is, the company's financial situation has changed such that the company may need to be transformed. In addition or alternatively, the company database 120 may be analyzed when market and/or internal triggers 215 and 220 occur to any companies in the company database 120.

A market trigger 215 may occur when a company lacks the capability to respond and compete to market changes, when the company may be at risk of a takeover, when there may be current or pending regulatory changes which may adversely affect the company's market positioning, and when the company's current strategy and path may be inadequate for market trends and realities. For example, if a competing company has changed the dynamics of the market by leveraging a disruptive technology or strategy and the current growth trajectory of a company in the company database 120 may be diminished by this new competitive strategy or disruptive technology, then relative to the company in the company database 120, that event may be characterized as a market trigger. In this case, financial information of the company or companies experiencing the market trigger may be analyzed at block 216 to determine whether the company(ies) may be on the verge of experiencing a financial trigger. Historical examples of this include Netflix™ market entry and novel business model to market leader Blockbuster™ or mini steel mills disrupting large vertically integrated steel mills. A market trigger such as this would likely be a precursor to a financial trigger and a leading indicator that a transformation may be necessary.

An internal trigger 220 may occur when there may have been a significant executive management change in a company or when new leadership may be looking to drive the company in a new direction. An internal trigger may also occur when employee turnover and productivity may be above that of industry benchmarks, when there may be cultural issues impacting marketplace success, when there may have been a failure around a key success factor (e.g., pharmaceutical pipeline dries up, oil company operated in political unstable markets), and when there may have been a change in ownership structure (e.g., public offering, privatization). Internal triggers such as a leadership change or ownership structure change may be typical leading indicators of underlying difficulties within a company and a potential underlying need for transformation. It may be shown that a company experiencing an internal trigger may eventually experience a financial trigger as well. Financial information of a company experiencing an internal trigger may be analyzed at block 221 to determine whether it may be on the verge of experiencing a financial trigger.

At block 225, if a financial trigger has been detected for a company or companies, then information related to the company(ies) may be stored in the transformation candidate database 125. The information stored in the transformation candidate database 125 may then be displayed on a display coupled to the processing computer 100.

Figure 3:
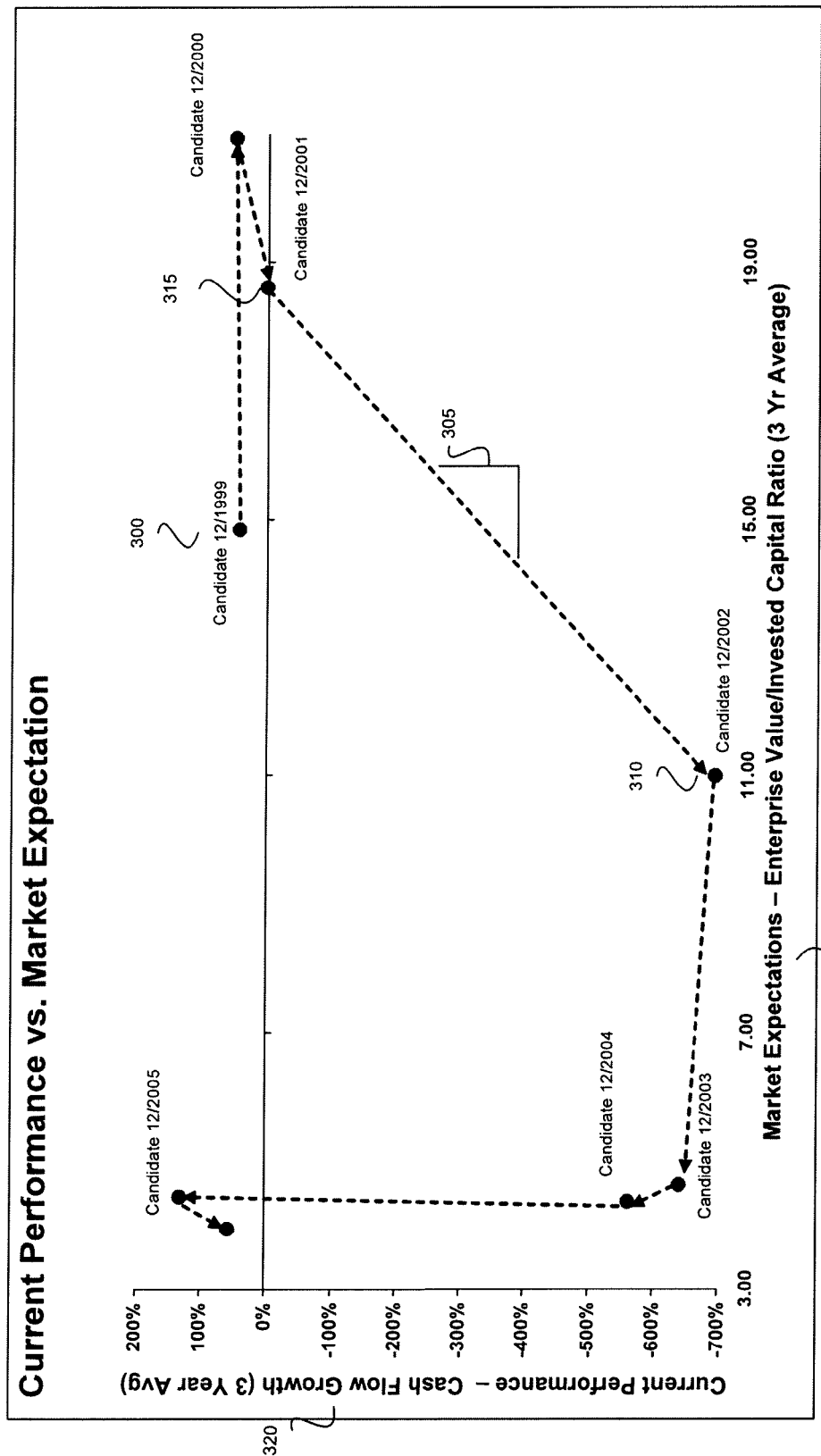

FIG. 3 is a chart illustrating an exemplary company experiencing a financial trigger. Referring to FIG. 3, the vertical axis 320 represents the company's cash flow average for the previous 3 years and the horizontal axis 325 represents the market expectation for the company, which may be based on a three year average of the ratio of the company's value to its invested capital. The market expectation may be represented by the ratio of the value of the company to the amount of invested capital in the company. The higher the ratio, the higher the market expectation. As shown in FIG. 3, at a first time 300 the company has a cash flow growth of approximately 50% and a market expectation value of 15. At a second time 315, the cash flow growth has dropped to 0%, but the market expectation has increased to 19. However, at a third time 310, the cash flow has dropped to −700% and the market expectation has also dropped to 11. The financial trigger in this case occurred between the second time 315 and the third time 310 and may be identified by the slope of the line connecting the two points 305. Stated mathematically, the trigger may occur when the following equation may be satisfied:

$$\frac{\Delta Cashflow}{\Delta (Enterprisevalue/Investedcapital)} > X$$

Where X corresponds to the slope of the line connecting the two points 305. Through statistical means, it may be shown that when the slope of the line is greater than 10%, company wide transformation may be necessary. As may be apparent from the chart, the financial trigger may have been detected shortly after the second time 315. But in this example, the company failed to recognize the significance of its problems and by the third time 310, the company had suffered significant erosion in its market premium primarily because the company failed to address its cash flow decline. Analyzing the financial information in this way captures the inflection point where a company's current execution may not be in line with market expectation, allowing for corrective action before significant shareholder loss.

Figure 4:
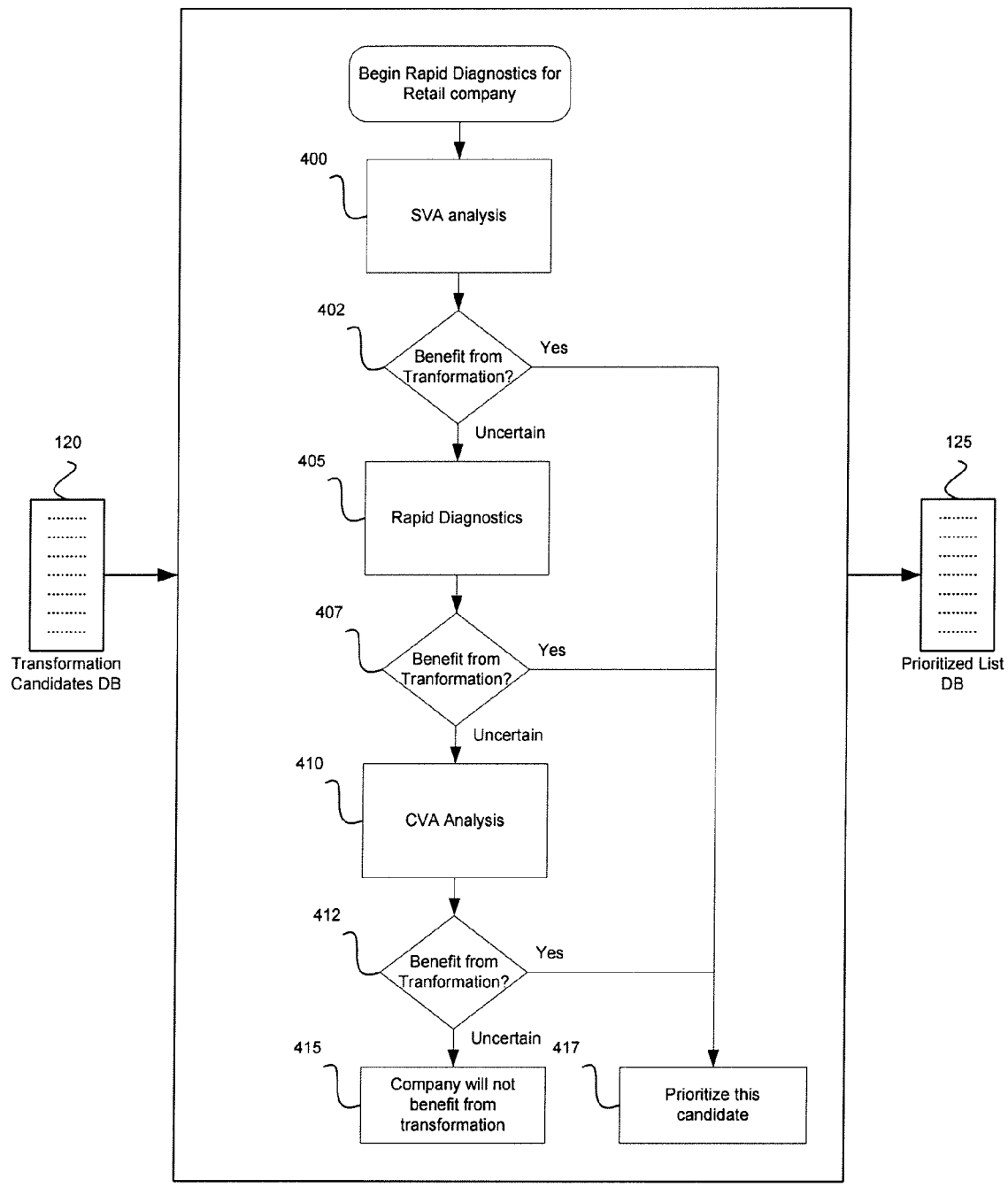

FIG. 4 is a flow diagram for prioritizing the list of transformation candidates. Prioritizing may be utilized to identify those companies within the transformation candidates database 125 that would achieve the greatest net benefit if transformed. At block 400, a share holder value (SVA) analysis may be performed on a candidate company. The SVA may be utilized to provide a first order assessment as to whether transformation may be beneficial to a company. SVA corresponds to an analysis of a company's performance from an outside investor's perspective. In this regard, the analysis may be conducted based on information that may be publicly available. For example, the analysis may include reviewing returns to shareholders over time and comparing the returns to those returns provided to the shareholders of peer companies. The analysis may also include, linking these returns to underlying drivers of value. For example, the drivers may be based on the spread, or the returns on invested capital generated by the company after subtracting the cost of capital. The drivers may also be based on the growth of free cash flows generated by the company. The analysis may also include linking operational drivers, such as inventory turns or store level profitability to the value drivers discussed above.

In some cases, it may be clear from the SVA by itself that a company may benefit, as represented by block 402. If this is the case, then the company may be prioritized at block 417. If it isn't clear from the SVA that the company may benefit, then the information gathered during SVA may be utilized to approach a transformation candidate and to recommend a second order assessment of the company. For example, the information may be shown to the directors of a transformation candidate to apprise them of an impending adverse situation.

At block 405, a set of rapid diagnostics may be performed on a company that may need transformation. Rapid diagnostics is a set of analyses that may quickly provide a point of view on whether a company may be a candidate for transformation. Rapid diagnostics may correspond to the second order assessment described above. The analysis may be conducted by consultants that work within the company. In this regard, the company may have been previously identified via SVA as a likely candidate for transformation and then engaged via a consulting company. The analysis may be rapid in the sense that the analysis may be completed in a relatively short amount of time. This provides a way of assessing a company's chance of success while minimizing consulting fees.

Information collected during the rapid diagnostics may be utilized during the transformation engagement as the diagnostics may identify areas within a company that are causing trouble for the company. The rapid diagnostic may be designed to answer key questions about a company. For example, financial questions to be answered could include:
  a) What may be the value gap between investor expectations and company's plans for shareholder value creation?
  b) Are investor expectations for future growth low relative to industry peers?
  c) Is company's profitability increasing in this industry over time?
  d) Do one or more business units suffer from declining revenues/lack of demand?
  e) Do one or more business units suffer from poor competitive advantage due to cost or capital position?
Market related question that may be answered include:
  a) Is the market growing?
  b) What are company's expectations for top line growth versus peers? Is company a leader or a laggard?
  c) How profitable is company relative to competitors?
  d) Is the company losing customers/market share?
  e) What competitive pressures exist and are anticipated?
  f) What regulatory changes are anticipated?
  g) Is there pressure to enter new geographic markets?
  h) Is industry redefining game change/disruptive innovation occurring?
Internal questions may also be addressed. For example,
  a) Has there been a CEO or leadership change?
  b) Does the company have a clearly defined and relevant vision?

c) Are there any legal or regulatory concerns (e.g., SEC investigation, product liability)?
d) How innovative is the company (e.g., # new products/services)? [note: for innovation dependent sectors]
e) Does the company have the capability to foresee and adapt quickly to market changes?
f) Has there been a failure around a key success factor (e.g., pharmaceutical pipeline dries up, oil company operated in political unstable markets)?
g) Has there been a change in ownership structure (e.g., public offering, privatization)?

The result of the rapid diagnostics may indicate that the company may benefit from a transformation, as represented by block 407. If this is the case, then the company may be prioritized at block 417. If it still isn't clear after the SVA and the rapid diagnostics that the company may benefit, then the information gathered from both the SVA and the rapid diagnostics may be utilized to approach a transformation candidate and to recommend a third order assessment of the company.

At block 410, a culture value analysis (CVA) may be performed on a company that may need transformation. CVA may correspond to the third order assessment described above. CVA may be utilized to measure several key elements of organizational culture, such as an assessment of culture, retention, capacity to change and strategic thrust alignment. This data may then be utilized to compare the company with other companies within the company's peer group and to determine a company's willingness to embrace a transformation process. The analysis may comprise sending survey questions to employees within a transformation candidate and comparing the answers received to those of other companies within the company's peer group. The response data may be analyzed and compared by the sub-groups such as, position within the organization, business unit, function, and geography.

The survey itself may include a number of questions. For example, statements may be presented to the employee and the employee may be asked to rate the statements based on whether the employee strongly disagrees, moderately disagrees, is neutral, moderately agrees, strongly agrees, or is unable to rate the statement. Examples of the statements include:
a) Change is valued and seen as desirable in ABC Co.
b) In ABC Co, we do not hesitate to challenge ineffective practices or out-dated assumptions.
c) ABC Co leadership is highly receptive to changing the way we do things here.
d) In ABC Co, we always hold people personally accountable for achieving their work goals and objectives.
e) ABC Co. leadership stresses the importance of clear goals for keeping us focused and on-track.
f) People who do not deliver on commitments do not last long in ABC Co.

Open ended questions may be presented as well. For example the employee may be asked to describe the culture of the organization (e.g., what is it like to work here? How is it different from previous places you've worked?). Virtual focus group questions may also be presented. For example, a question to gauge the "silo mentality" of the organization may be phrased as "You seem to believe that people in this company are more focused on their department or group than on the broader needs of the organization. What can be done to reduce the tendency of a "silo mentality?"

The CVA may also provide an indication of leadership strengths and challenges which may be utilized during a transformation process. The information gathered during the CVA may be utilized to further prioritize the list of transformation candidates and may also be utilized during the transformation engagement process. For example, the information may be utilized to show directors of a company how individuals within the company feel about their respective jobs.

The result of the CVA may indicate that the company may benefit from a transformation, as represented by block 412. If this is the case, then the company may be prioritized at block 417. If after the SVA, rapid diagnostics, and CVA it is not clear that the company may benefit, then at block 415 the company is given a low priority.

Figure 5:
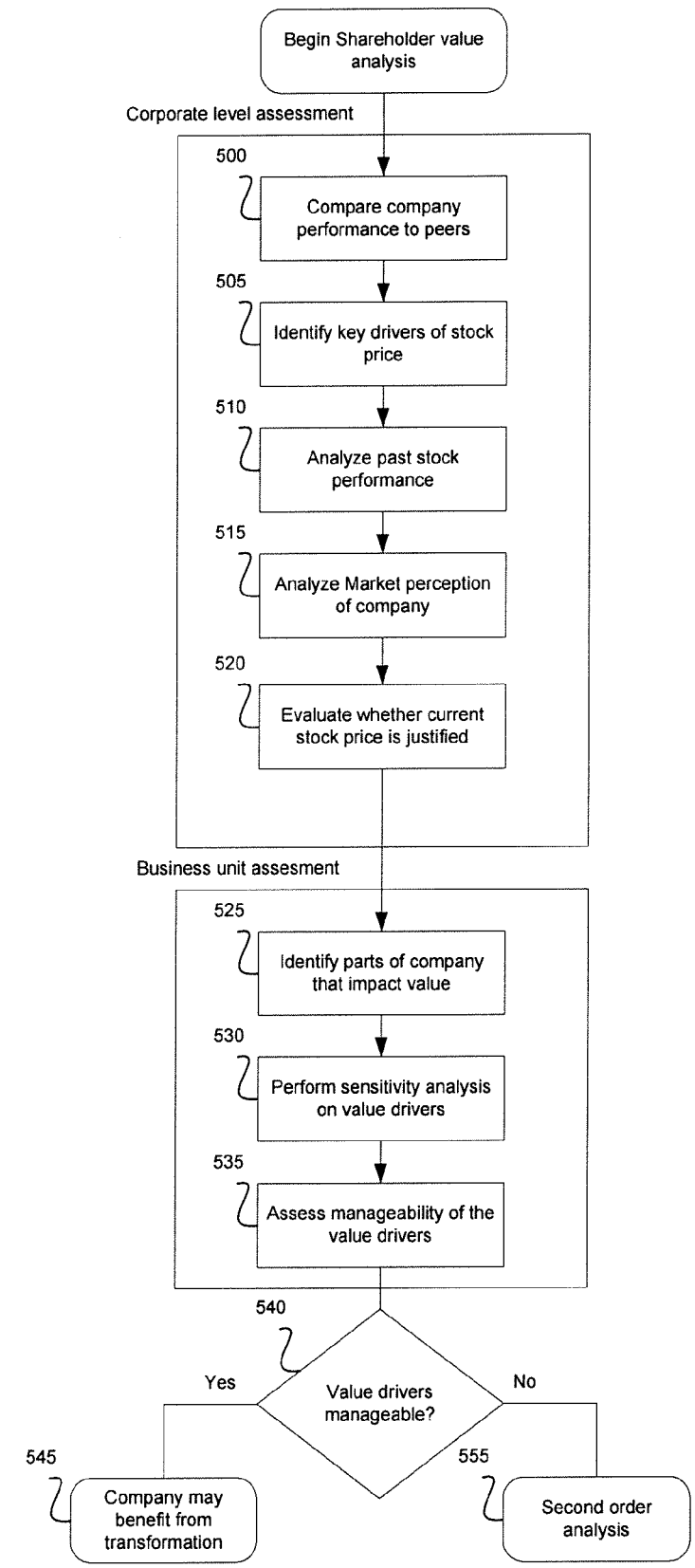
FIG. 5 is a flow diagram showing an embodiment of a process for conducting a shareholder value analysis of a company by the system of FIG. 1 in accordance with the present invention.

FIG. 5 is a flow diagram for conducting a shareholder value analysis (SVA) of a company as performed in block 400. As noted above, SVA may be utilized to provide a first order assessment as to whether transformation may be beneficial to a company. The analysis may be begin by analyzing a company from the perspective of an outside investor, that is from the corporate level. At block 500, the performance of the company may be compared to its peers. At block 505, the key drivers of the stock price may be determined. At block 510, the past performance of the stock price may be analyzed. At block 515, the market perception of the company is analyzed. Finally, at block 520, a determination may be made as to whether the stock price of the company may be justified.

Figure 6:
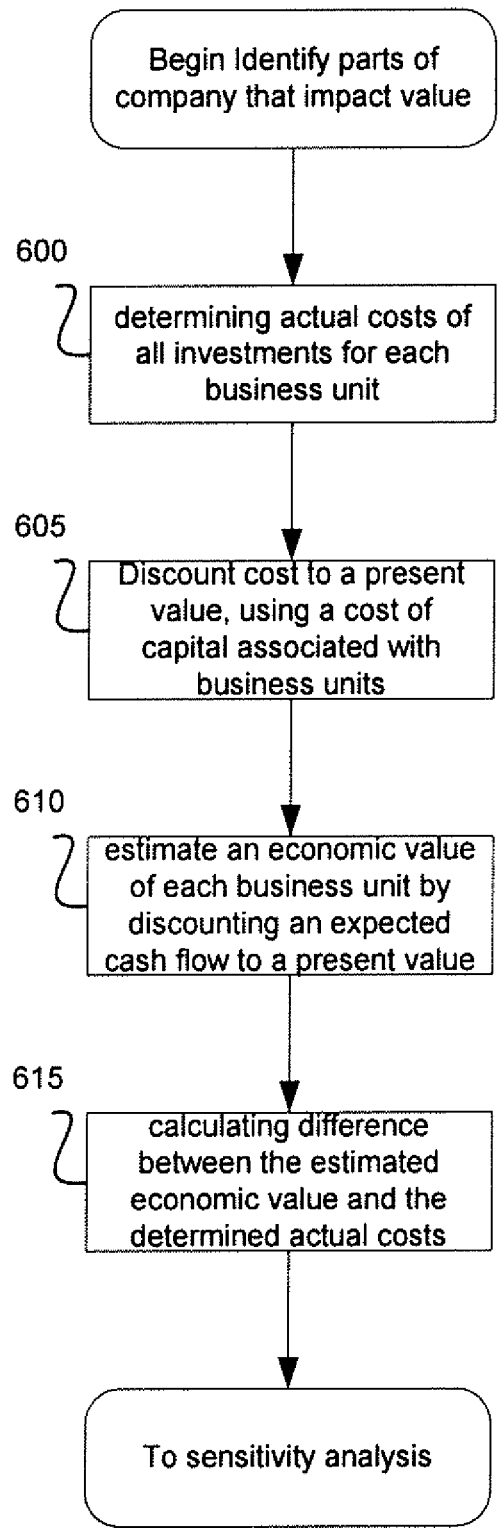
FIG. 6 is a flow diagram showing an embodiment of a process for locating business units within a company that have the greatest impact on the value of a company by the system of FIG. 1 in accordance with the present invention.

Next a more in depth analysis of the company may be performed. In this case, the company may be analyzed on a business unit by business unit basis. At block 525, the parts of the company that impact value may be determined. For example, it may be the case that a particular business unit within a company may be losing revenue for the company. FIG. 6 is a flow diagram for identifying such a business unit. Referring to FIG. 6, at block 600, the actual cost of all investments in for each business unit within a company may be determined. At block, 605, the costs may be discounted to a present value using a cost of capital associated with the business unit. At block 610, the economic value of each business unit may be estimated by discounting an expected cash flow of the business unit to a present value. At block 615, the difference between the estimated economic value and the determined actual costs may be calculated. The greater the difference, the greater impact that unit may have to the value of the company.

Referring back to FIG. 5, at block 530 a sensitivity analysis of value drivers may be performed on each business unit identified in the previous step to determine the significance of the value creation or destruction caused by that business unit. At block 535, the manageability of those businesses that have a significant impact to the value of the company may be assessed. At this point, a determination may be made as to what functions within the business unit may be causing a significant impact to the value. For example, marketing costs within the business unit may have an impact on the company's revenue. At block 540 it is determined whether the value drivers are manageable. This in turn may be an indication of whether the company may benefit from a transformation. Block 545 represents the case where the company may benefit from a transformation. If it is not clear from the SVA that the company may benefit from transformation, then at block 555 a second order analysis of the company, such as a rapid diagnostics, may be in order.

Figure 7:
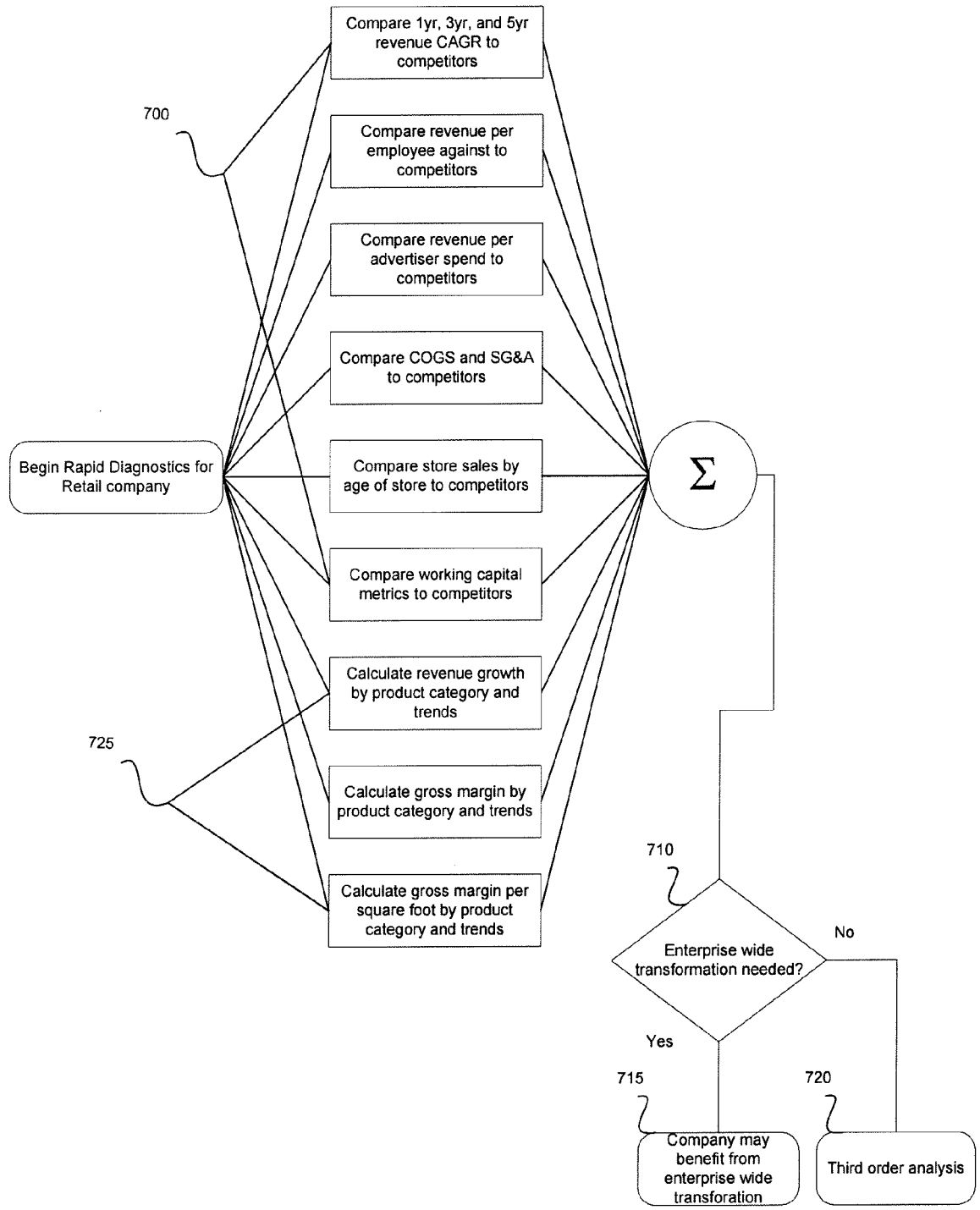
FIG. 7 is a flow diagram of an exemplary set of rapid diagnostic that may be performed on a retail company by the system of FIG. 1 in accordance with the present invention.

FIG. 7 is a flow diagram of an exemplary set of rapid diagnostic that may be performed on a retail company. As noted above, rapid diagnostics may be utilized to provide a second order assessment as to whether transformation may be beneficial to a company. The set of analysis may include a series of comparisons 700, comparing a transformation candidate to other companies operating in that same industry. For example, in the retail context the set of comparisons may include,
- a) 1, 3, and 5 year revenue Compound Annual Growth Rate (CAGR) 500
- b) revenue per employee
- c) "marketing productivity" (e.g. revenue per advertising spend)
- d) cost of goods sold (COGS) and selling, general & administrative (SG&A) expense
- e) Working capital metrics (e.g., days sales outstanding, inventory days and accounts payable days
- f) Store sales by age of store In addition, a series of calculations 725 may be performed. This may include calculating:
- a) revenue growth by product category and trends
- b) Gross margin by product category and trends
- c) Gross margin per square foot by category and trends If the analysis reveals that an enterprise wide transformation may be necessary, this may be an indication that the company may benefit from a transformation. This is represented by block 715. If this is the case, then this company may be given an increased priority. An enterprise wide transformation may be necessary if difficulties may have been pervasive throughout the company. For example, if a retailer were experiencing lower demand in both new stores and older stores and across product lines. However, if demand were decreasing only in one or two smaller product lines, a more targeted engagement might be required. Otherwise, the transformation priority for that company may be decreased at block 720 and the company may not be engaged at all.

If it is not clear after the rapid diagnostics that the company may benefit from transformation, then at block 720 a third order analysis of the company, such as a culture value analysis, may be in order.

Figure 8:
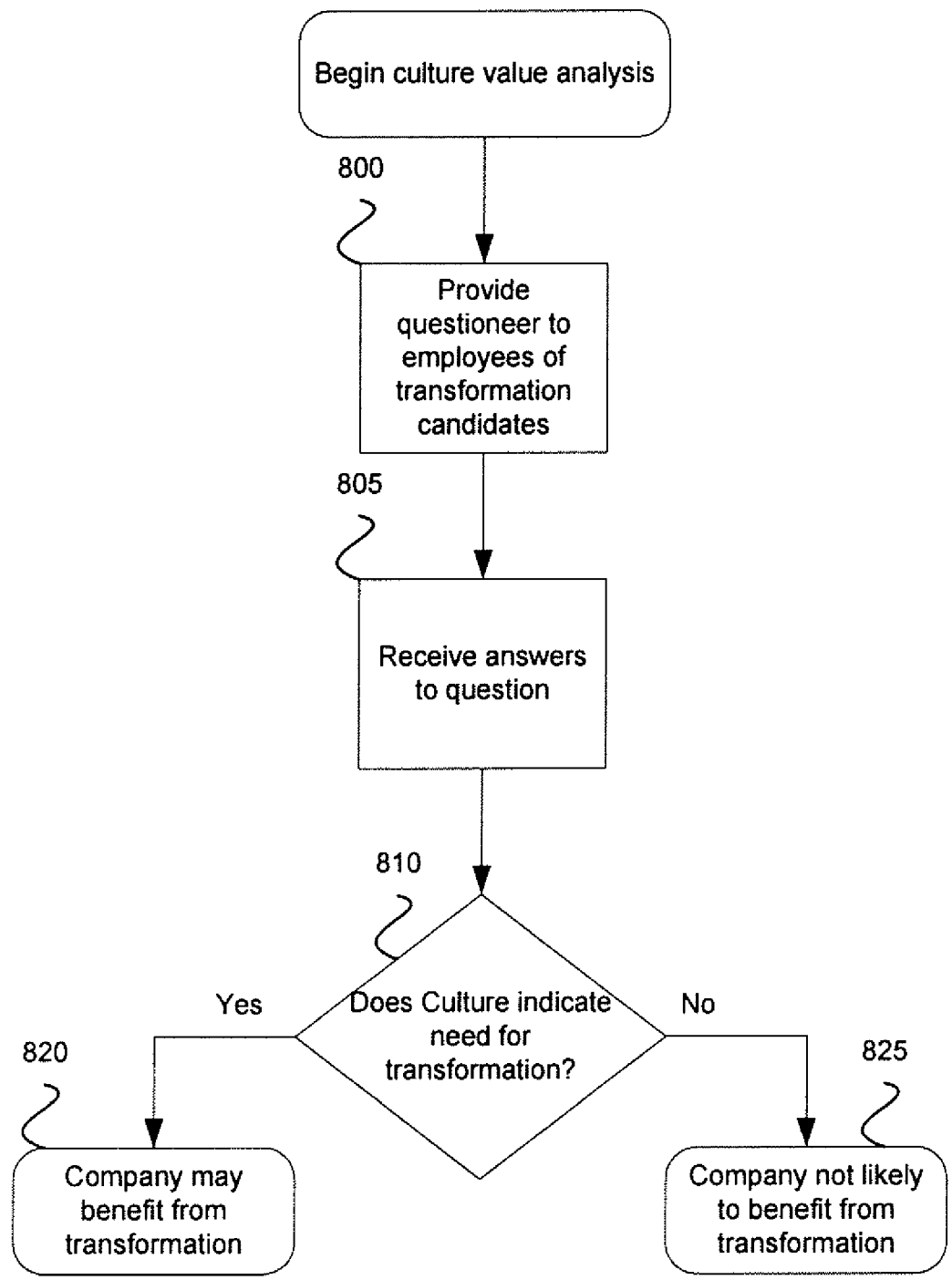
FIG. 8 is a flow diagram for conducting a culture value analysis of a transformation candidate by the system of FIG. 1 in accordance with the present invention.

FIG. 8 is a flow diagram for conducting a culture value analysis (CVA) of a transformation candidate. As noted above, CVA may be utilized to provide a third order assessment as to whether transformation may be beneficial to a company. At block 800, a survey such as the one shown in FIG. 9 may be provided to employees of companies in the transformation candidates list. The survey may be available 24 hours a day via the internet and may be available in multiple languages. As illustrated in FIG. 9, the survey may correspond to a series of questions. Employees may respond by indicated how strongly they agree or disagree with the questions posed.

Referring back to FIG. 8, at block 805, the answers from the survey may be received. The answer may be stored in a database residing on a computer such as the processing computer 100 (FIG. 1). At block 810, the same or different computer may analyze the data to determine whether the company's culture suggests that the company may benefit from a transformation. The result of this analysis may come by way of a report, such as the report shown in FIG. 10.

This report may be utilized to indicate an organizations readiness and capability to change. The values in the chart may be derived from the answers given to the survey questions. For example, the answer to a question such as "ABC Co leadership is highly receptive to changing the way we do things here" may effect the value of the Absence of Restriction Change index. The answers to a question such as "ABC Co. leadership stresses the importance of clear goals for keeping us focused and on-track" may effect the value of the Commitment to Shared Meaning index. Agreeing or disagreeing with these questions may raise or lower the value of the respective change index. These question may be weighted equally.

A negative change index values may correspond to a reduced capacity to change and a positive change index values may indicate an increased capacity to change. The result of the analysis may reveal that the company may benefit from a transformation, as represented by block 820. Otherwise, if the analysis reveals that the company may not be gain a substantial net benefit from a transformation, then no priority may be given to this company, as represented by block 825.

Figure 11:
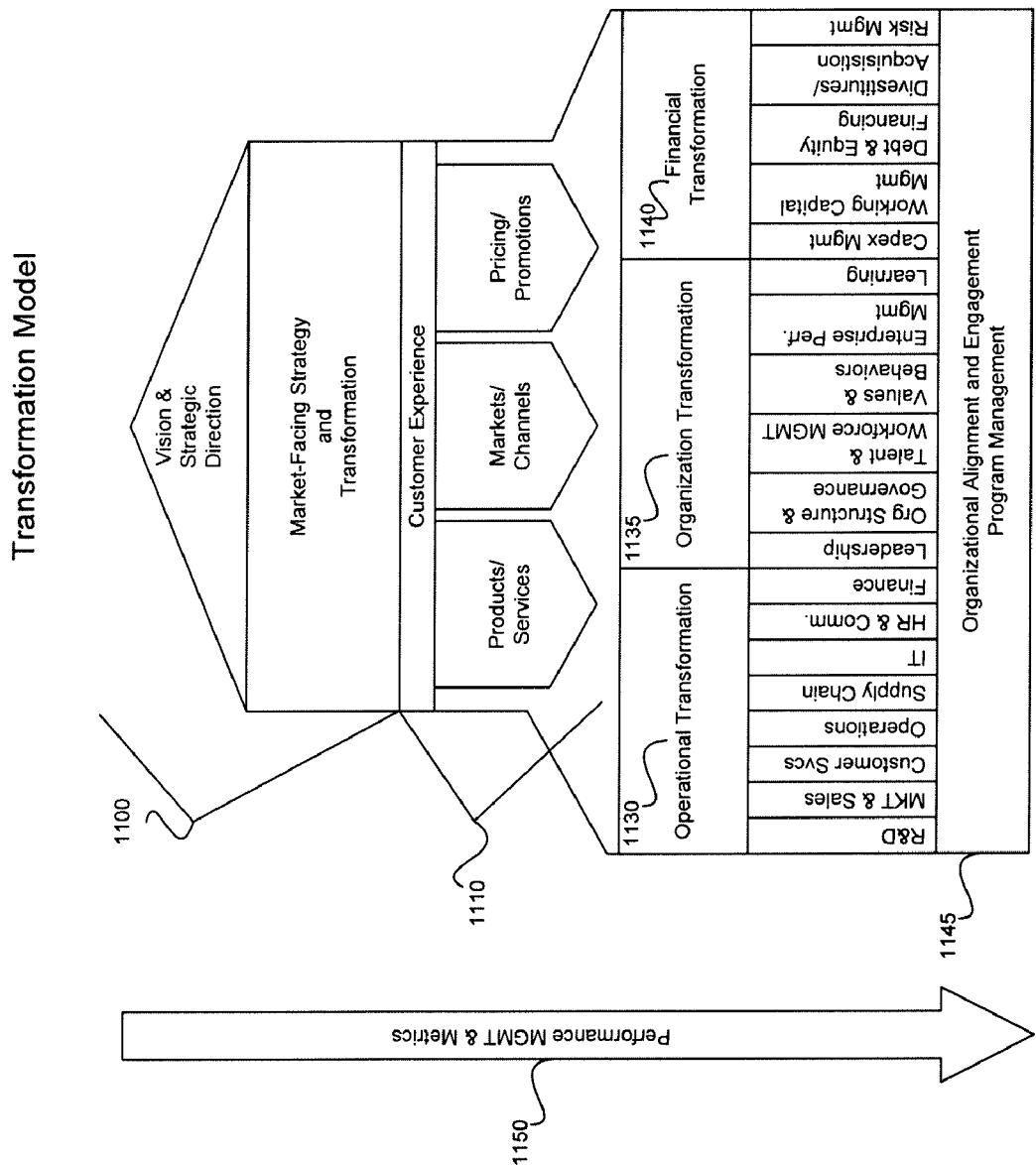
FIG. 11 is a flow diagram of a possible operating model focusing on customer experience that may be utilized as a blueprint for transforming a company that has experienced a performance trigger 1 in accordance with the present invention.

FIG. 11 is a diagram of an operating model focusing on customer experience that may be utilized as a blueprint for transforming a company that has experienced a performance trigger. Referring to region 1100, a vision & strategic direction may be determined, for example, by a corporate executives and/or consultants. In this regard, early in a transformation effort, the overall vision and aspiration for what a company wants to be is defined. The key elements of the vision and strategic direction are the strategic context and mission, an assessment of internal capabilities, defining vision and goals, developing a value proposition, defining the market perspective and developing the economic model to support the decisions of the Vision and Strategic Direction. This is the first step in any transformation and ensures that the entire firm is moving in sync toward a common goal.

Referring to region 1110, customer experience may be made into a reality by developing a plan focusing on products/services markets/channels and pricing/promotion. First, the portfolio of products and services that will enable the company to meet its objectives and goals is defined. Next, the company may define which markets and channels may be used to reach its customers for each product grouping. Finally, the operating plan may define what pricing will be successful in the marketplace based on desired positioning and market penetration goals. The customer experience may define how the customer will interact with the company at every touch point. The customer experience may be driven by the overall vision of the company.

Referring to region 1130, an assessment of capabilities that may be required to execute the operating plan may be developed based on the operating plan developed above. Key departments that may need to be transformed for the company to meet its objectives include R&D, marketing and sales, customer service, operations, supply chain management, information technology (IT), human resources (HR) and communications, and finance.

For example, in R&D intensive companies such as pharmaceutical or technology based companies, a research and development department may need to be transformed as part of the operating plan. Marketing and sales departments may require transformation as these departments may usually be the market facing arm of the organization.

Customer service departments may frequently require transformation, because those departments often have out dated approaches to reaching customers. For example, it is not unusual for call centers to be consolidated from hundreds of centers to fewer than 10 through streamlining and efficiency efforts.

Operations of a company may need to be transformed as well. In labor intensive industries, such as utilities or telecommunications companies, this may mean transforming the dispatching functions to dramatically reduce the number of service calls that may be required. Warehousing functions of an organization or the supply chain function may require transformation to gain efficiencies and mirror the changes in the operations. IT may need transformation because companies that undergo a transformation frequently have systems that do not support their new operations. Likewise, companies may need to transform their human resources or communications as well as their finance organizations to support a transformation.

Referring to region 1135, organizational transformation may be considered. Frequently, during a transformation in addition to the departments outlined above that need to be transformed, the supporting structures of the organization may also need to be transformed. This may include transforming the a) leadership, b) organization structure and governance, c) talent and workforce management, d) values and behaviors, e) enterprise performance management, and f) learning capability of the company. These are described in more detail below.

a) Leadership—The leadership team, as a whole, may possess the core values to create the new culture. The leadership team may be able to effectively articulate the vision and values of the organization to lower levels in the company.

b) Organization/governance—In a transformation the ability to tie organizational structures to the vision is required. A governance model that drives appropriate levels of accountability may be needed. This may ensure alignment of the enterprise operating model to the conceptual organization design.

c) Talent/workforce management—Colleagues may need to develop new talents and means of managing the workforce in a transformation to support the new direction of the company. Any identified gaps may be typically addressed through recruiting, rewards, succession planning, development, and like activities.

d) Values and behaviors—These may be elements of the corporate culture that may be measurable and may be defined and observed. Values and behaviors may be out of sync when a company transforms. For example, if new emphasis is placed on meeting customer expectations where a company may have previously been focused on regulatory metrics, values and behaviors would need to transform.

e) Enterprise Performance Management—This capability may be the ability to define the enterprise level metrics that support the business strategy and direction. The metrics are typically defined and measured against a balanced scorecard/dashboard.

f) Learning: This refers to an organizations ability to align learning to the enterprise level strategy, vision and values.

Referring to region 1140, financial transformation may be considered. This may be the case particularly where an overall restructuring is required Financial transformation may take into account a) capital expenditures (CAPEX) management, b) working capital management, c) debt and equity financing, d) divestitures and acquisitions, and e) risk management as explained in more detail below.

a) CAPEX Management—Capital intensive companies may require a particular focus on CAPEX management. This may correspond to finding ways to reduce the cost and risk of capital intensive projects.

b) Working Capital Management—Working capital management focuses on current or short-term assets and short-term liabilities and looks for ways to manage them more efficiently and effectively.

c) Debt and Equity Financing: Debt and Equity financing become alternatives to consider for firms that are distressed and may require funding to transform the company.

d) Divestiture/Acquisition: If a company does not have the capabilities required in the new operating model, a company may elect to acquire capabilities through an acquisition rather than develop capabilities organically. Similarly, certain business units may not deliver sufficient value to remain as part of the transformed company.

e) Risk Management: Risk management is the company's approach to managing uncertainty, assessing risk and developing strategies to manage or mitigate risk.

Referring to region 1145, organizational alignment and engagement of program management may occur. It may be the case that a transformation is a multi-year, enterprise wide effort that may require substantial cross organization coordination and alignment. These functions may be managed by the program management office.

Finally, referring to region 1150, through out the entire transformation process, metrics may be established and monitored to ensure appropriate progress is being made toward the transformation goals.

Figure 12:
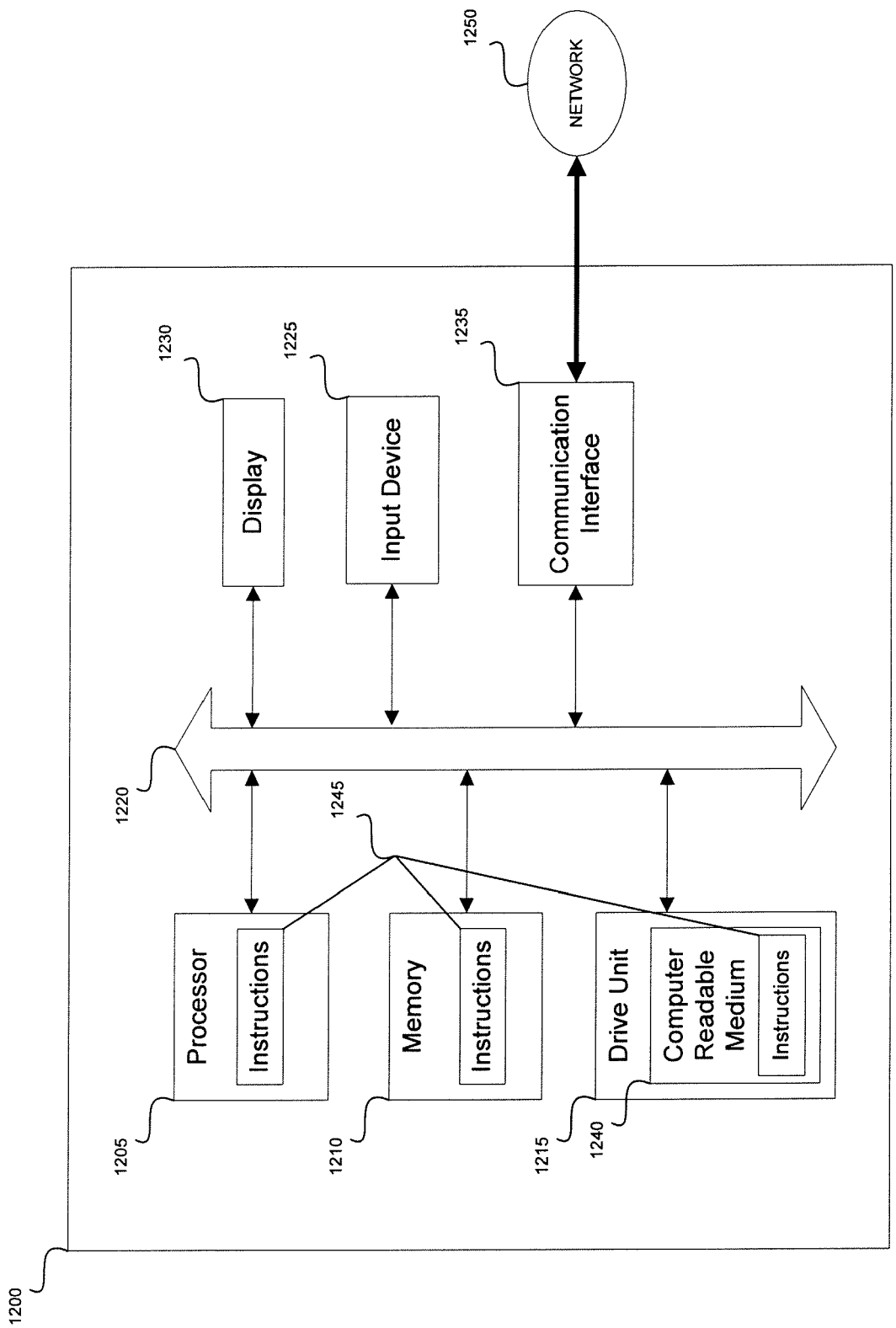
FIG. 12 schematically illustrates an embodiment of a computer system in accordance with the present invention.

FIG. 12 illustrates a general computer system, which may represent a processing computer or any of the other computing devices referenced herein. The computer system 1200 may include a set of instructions 1245 that may be executed to cause the computer system 1200 to perform any one or more of the methods or computer based functions disclosed herein. The computer system 1200 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 1200 may also be implemented as or incorporated into various devices, such as a personal computer (PC), a tablet PC, a set-top box (STP), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 1245 (sequential or otherwise) that specify actions to be taken by that machine. In one embodiment, the computer system 1200 may be implemented using electronic devices that provide voice, video or data communication. Further, while a single computer system 1200 may be illustrated, the term "system" shall also be taken to include any collection of systems or sub-systems that individually or jointly execute a set, or multiple sets, of instructions to perform one or more computer functions.

As illustrated in FIG. 12, the computer system 1200 may include a processor 1205, such as, a central processing unit (CPU), a graphics processing unit (GPU), or both. The processor 1205 may be a component in a variety of systems. For example, the processor 1205 may be part of a standard personal computer or a workstation. The processor 1205 may be one or more general processors, digital signal processors, application specific integrated circuits, field programmable gate arrays, servers, networks, digital circuits, analog circuits, combinations thereof, or other now known or later developed devices for analyzing and processing data. The processor 1205 may implement a software program, such as code generated manually (i.e., programmed).

The computer system 1200 may include a memory 1210 that can communicate via a bus 1220. The company database 120, the transformation candidates database 125, or the prioritized list of transformation candidates 130 may be stored in the memory 1210. The memory 1210 may be a main memory, a static memory, or a dynamic memory. The memory 1210 may include, but may not be limited to computer readable storage media such as various types of volatile and nonvolatile storage media, including but not limited to random access memory, read-only memory, programmable read-only memory, electrically programmable read-only memory, electrically erasable read-only memory, flash memory, magnetic tape or disk, optical media and the like. In one case, the memory 1210 may include a cache or random access memory for the processor 1205. Alternatively or in addition, the memory 1210 may be separate from the processor 1205, such as a cache memory of a processor, the system memory, or other memory. The memory 1210 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 1210 may be operable to store instructions 1245 executable by the processor 1205. The functions, acts or tasks illustrated in the figures or described herein may be performed by the programmed processor 1205 executing the instructions 1245 stored in the memory 1210. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 1200 may further include a display 1230, such as a liquid crystal display (LCD), an organic light emitting diode (OLED), a flat panel display, a solid state display, a cathode ray tube (CRT), a projector, a printer or other now known or later developed display device for outputting determined information. The display 1230 may act as an interface for the user to see the functioning of the processor 1205, or specifically as an interface with the software stored in the memory 1210 or in the drive unit 1215. In this regard, the display 1230 may be utilized to display, for example, whether a business organization is a candidate for transformation. The display 1230 may also be utilized to display a transformation plan. In addition, the various reports and surveys described above may be presented on the display 1230.

Additionally, the computer system 1200 may include an input device 1225 configured to allow a user to interact with any of the components of system 1200. The input device 1225 may be a number pad, a keyboard, or a cursor control device, such as a mouse, or a joystick, touch screen display, remote control or any other device operative to interact with the system 1200.

The computer system 1200 may also include a disk or optical drive unit 1215. The disk drive unit 1215 may include a computer-readable medium 1240 in which one or more sets of instructions 1245, e.g. software, can be embedded. Further, the instructions 1245 may perform one or more of the methods or logic as described herein. The instructions 1245 may reside completely, or at least partially, within the memory 1210 and/or within the processor 1205 during execution by the computer system 1200. The memory 1210 and the processor 1205 also may include computer-readable media as discussed above.

The present disclosure contemplates a computer-readable medium 1240 that includes instructions 1245 or receives and executes instructions 1245 responsive to a propagated signal; so that a device connected to a network 1250 may communicate voice, video, audio, images or any other data over the network 1250. The instructions 1245 may be implemented with hardware, software and/or firmware, or any combination thereof. Further, the instructions 1245 may be transmitted or received over the network 1250 via a communication interface 1235. The communication interface 1235 may be a part of the processor 1205 or may be a separate component. The communication interface 1235 may be created in software or may be a physical connection in hardware. The communication interface 1235 may be configured to connect with a network 1250, external media, the display 1230, or any other components in system 1200, or combinations thereof. The connection with the network 1250 may be a physical connection, such as a wired Ethernet connection or may be established wirelessly as discussed below. Likewise, the additional connections with other components of the system 1200 may be physical connections or may be established wirelessly.

The network 1250 may include wired networks, wireless networks, or combinations thereof. Information related to business organizations may be provided via the network 1250. The wireless network may be a cellular telephone network, an 802.11, 802.16, 802.20, or WiMax network. Further, the network 1250 may be a public network, such as the Internet, a private network, such as an intranet, or combinations thereof, and may utilize a variety of networking protocols now available or later developed including, but not limited to TCP/IP based networking protocols.

The computer-readable medium 1240 may be a single medium, or the computer-readable medium 1240 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 1240 may include a solid-state memory such as a memory card or other package that houses one or more non-volatile read-only memories. The computer-readable medium 1240 also may be a random access memory or other volatile re-writable memory. Additionally, the computer-readable medium 1240 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The method and system may also be embedded in a computer program product, which included all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the method and system has been described with reference to certain embodiments, it will be understood by those skilled in the art that various changes may be made and equivalents may be substituted without departing from the scope. In addition, many modifications may be made to adapt a particular situation or material to the teachings without departing from its scope. Therefore, it is intended that the present method and system not be limited to the particular embodiment disclosed, but that the method and system include all embodiments falling within the scope of the appended claims.

We claim:

1. A method for identifying a business organization that needs transformation, the method comprising:
receiving, at a computer, first financial data that defines a financial state of a business organization at a first time;
storing, by the computer, the first financial data to a database;
receiving, at the computer, second financial data that defines the financial state of the business organization at a second time that is later than the first time, the second time corresponding to one of: a fixed period after the first time, a time at which a user specifies to the computer an occurrence of a change in market conditions, and a time at which a user specifies to the computer an occurrence of an internal reorganization of the business organization;
selecting, by the computer, the first financial data from the database at the second time;
comparing, by the computer, the first financial data with the second financial data to thereby determine
whether the business organization has had a financial trigger, which corresponds to a financial change (FC) that exceeds a pre-determined threshold,
wherein FC is calculated according to:

$$FC = \frac{\Delta Cashflow}{\Delta (Enterprisevalue/Investedcapital)}$$

where $\Delta Cashflow$ corresponds to a change in the cash flow of a business organization over time and $\Delta(Enterprisevalue/Investedcapital)$ corresponds to a change in the ratio of the enterprise value of the business organization to the capital invested in the business organization over the same time;

if a financial trigger has occurred, adding, by the computer, the business organization to data that defines a list of transformation candidates; and
displaying on a display device in communication with the computer one or more business organizations in the list.

2. The method according to claim 1, wherein the information comprises financial information that further comprises at least one of: profitability and a profitability growth rate over time, revenue and a revenue growth rate over time, and cash flow and a cash flow growth rate over time.

3. The method according to claim 1, wherein the performance trigger corresponds to at least one of: a financial trigger, a market trigger, and an internal trigger, wherein the internal trigger corresponds to changes in internal conditions of the business organization.

4. The method according to claim 3, wherein the financial trigger corresponds to a decline in a growth rate of at least one of: the profitability and the cash flow.

5. The method according to claim 4, wherein the decline in the growth rate is at least 10%.

6. The method according to claim 3, wherein the market trigger corresponds to changes in market conditions that have an adverse effect on the business organization that has had the performance trigger.

7. The method according to claim 1, further comprising:
prioritizing the list of transformation candidates.

8. The method according to claim 7, wherein a candidate that is most likely to benefit from a transformation is displayed at the top of the list of transformation candidates.

9. The method according to claim 7, wherein the prioritizing comprises:
identifying a business unit within an identified business transformation candidate that results in a decline in a shareholder value;
determining a reason as to why the identified business unit causes at least in part the decline in the shareholder value; and
assessing a cost needed to transform the business transformation candidate to reduce the decline in shareholder value, where higher priority is given to transformation candidates that are most likely to benefit from a transformation.

10. The method according to claim 9, wherein identifying comprises:
determining actual costs of all investments for all business units within a transformation candidate, discounted to a present value, using a cost of capital associated with the identified business units;
estimating an economic value of the identified business unit by discounting an expected cash flow to a present value; and
calculating a difference between the estimated economic value and the determined actual costs.

11. The method according to claim 9, wherein the reason for the decline in shareholder value is determined by evaluating at least one of:
1) a value gap between investor expectations and each transformation candidate's plans for shareholder value creation,
2) whether investor expectations for future growth are low relative to industry peers,
3) whether the transformation candidate's profitability is increasing over time,
4) whether one or more entities within each transformation candidate suffers from declining revenues and lack of demand, and 5) whether one or more entities of the transformation candidate suffers from poor competitive advantage due to cost or capital position.

12. A method for identifying and transforming a business organization, the method comprising:
receiving, at a computer, first financial data that defines a financial state of a business organization at a first time;
storing, by the computer, the first financial data to a database;
receiving, at the computer, second financial data that defines the financial state of the business organization at a second time that is later than the first time, the second time corresponding to one of: a fixed period after the first time, a time at which a user specifies to the computer an occurrence of a change in market conditions, and a time at which a user specifies to the computer an occurrence of an internal reorganization of the business organization;
selecting, by the computer, the first financial data from the database at the second time;
comparing, by the computer, the first financial data with the second financial data to thereby determine
whether the business organization has had a financial trigger, which corresponds to a financial change (FC) that exceeds a pre-determined threshold,
wherein FC is calculated according to:

$$FC = \frac{\Delta Cashflow}{\Delta(Enterprisevalue/Investedcapital)}$$

where $\Delta$Cashflow corresponds to a change in the cash flow of a business organization over time and $\Delta$(Enterprisevalue/Investedcaptial) corresponds to a change in the ratio of the enterprise value of the business organization to the capital invested in the business organization over the same time;
if a financial trigger has occurred, adding, by the computer, the business organization to data that defines a list of transformation candidates;
forming a transformation plan for the business organization if the business organization has been added to the list of transformation candidates; and
displaying the transformation plan on a display device in communication with the computer.

13. The method according to claim 12, further comprising prioritizing the list of transformation candidates so that candidates that are most likely to benefit from a transformation are given the highest priority.

14. A non-transitory machine-readable storage medium having stored thereon, a computer program comprising at least one code section for identifying a business organization that needs transformation, the at least one code section being executable by a machine for causing the machine to perform acts of:
receiving first financial data that defines a financial state of a business organization at a first time;
storing the first financial data to a database;
receiving second financial data that defines the financial state of the business organization at a second time that is later than the first time, the second time corresponding to one of: a fixed period after the first time, a time at which a user specifies to the computer an occurrence of a change in market conditions, and a time at which a user specifies to the computer an occurrence of an internal reorganization of the business organization;
selecting the first financial data from the database at the second time;
comparing the first financial data with the second financial data to thereby determine
whether the business organization has had a financial trigger, which corresponds to a financial change (FC) that exceeds a pre-determined threshold,
wherein FC is calculated according to:

$$FC = \frac{\Delta Cashflow}{\Delta(Enterprisevalue/Investedcapital)}$$

where $\Delta$Cashflow corresponds to a change in the cash flow of a business organization over time and $\Delta$(Enterprisevalue/Investedcaptial) corresponds to a change in the ratio of the enterprise value of the business organization to the capital invested in the business organization over the same time;
if a financial trigger has occurred, adding the business organization to data that defines a list of transformation candidates; and
displaying on a display device one or more business organizations in the list.

15. The machine-readable storage medium according to claim 14, wherein the information comprises financial information that further comprises at least one of: profitability and a profitability growth rate over time, revenue and a revenue growth rate over time, and cash flow and a cash flow growth rate over time.

16. The machine-readable storage, medium according to claim 14, wherein the performance trigger corresponds to at least one of: a financial trigger, a market trigger, and an internal trigger, wherein the internal trigger corresponds to changes in internal conditions of the business organization.

17. The machine-readable storage medium according to claim 16, wherein the financial trigger corresponds to a decline in a growth rate of at least one of: the profitability and the cash flow.

18. The machine-readable storage medium according to claim 17, wherein the decline in the growth rate is at least 10%.

19. The machine-readable storage medium according to claim 16, wherein the market trigger corresponds to changes in market conditions that have an adverse effect on the business organization that has had the performance trigger.

20. The machine-readable storage medium according to claim 14, wherein the at least one code section comprises code that enables prioritizing the list of transformation candidates.

21. The machine-readable storage medium according to claim 20, wherein a candidate that is most likely to benefit from a transformation is displayed at the top of the list of transformation candidates.

22. The machine-readable storage medium according to claim 20, wherein the prioritizing comprises:
identifying a business unit within an identified business transformation candidate that results in a decline in a shareholder value;
determining a reason as to why the identified business unit causes at least in part the decline in the shareholder value; and
assessing a cost needed to transform the business transformation candidate to reduce the decline in shareholder value, where higher priority is given to transformation candidates that are most likely to benefit from a transformation.

23. The machine-readable storage medium according to claim 22, wherein identifying comprises:
   determining actual costs of all investments for all business units within a transformation candidate, discounted to a present value, using a cost of capital associated with the identified business units;
   estimating an economic value of the identified business unit by discounting an expected cash flow to a present value; and
   calculating a difference between the estimated economic value and the determined actual costs.

24. The machine-readable storage medium according to claim 22, wherein the reason for the decline in shareholder value is determined by evaluating at least one of:
   1) a value gap between investor expectations and each transformation candidate's plans for shareholder value creation,
   2) whether investor expectations for future growth are low relative to industry peers,
   3) whether the transformation candidate's profitability is increasing over time,
   4) whether one or more entities within each transformation candidate suffers from declining revenues and lack of demand, and
   5) whether one or more entities of the transformation candidate suffers from poor competitive advantage due to cost or capital position.

25. A non-transitory machine-readable storage medium having stored thereon, a computer program comprising at least one code section identifying and transforming a business organization, the at least one code section being executable by a machine for causing the machine to perform acts of:
   receiving first financial data that defines a financial state of a business organization at a first time;
   storing the first financial data to a database;
   receiving second financial data that defines the financial state of the business organization at a second time that is later than the first time, the second time corresponding to one of: a fixed period after the first time, a time at which a user specifies to the computer an occurrence of a change in market conditions, and a time at which a user specifies to the computer an occurrence of an internal reorganization of the business organization;
   selecting the first financial data from the database at the second time;
   comparing the first financial data with the second financial data to thereby determine
   whether the business organization has had a financial trigger, which corresponds to a financial change (FC) that exceeds a pre-determined threshold,
   wherein FC is calculated according to:

$$FC = \frac{\Delta Cashflow}{\Delta (Enterprisevalue / Investedcapital)}$$

where $\Delta$Cashflow corresponds to a change in the cash flow of a business organization over time and $\Delta$(Enterprisevalue/Investedcaptial) corresponds to a change in the ratio of the enterprise value of the business organization to the capital invested in the business organization over the same time;
   if a financial trigger has occurred, adding the business organization to data that defines a list of transformation candidates;
   forming a transformation plan for the business organization if the business organization has been added to the list of transformation candidates; and
   displaying the transformation plan on a display device.

26. The machine-readable storage medium according to claim 25, wherein the at least one code section comprises code that enables prioritizing the list of transformation candidates so that candidates most likely to benefit from a transformation are given the highest priority.

27. A system for identifying a business organization that needs transformation, the system comprising:
   a computer configured to receive first financial data that defines a financial state of a business organization at a first time;
   store hardware configured to the first financial data to a database;
   receive second financial data that defines the financial state of the business organization at a second time that is later than the first time, the second time corresponding to one of: a fixed period after the first time, a time at which a user specifies to the computer an occurrence of a change in market conditions, and a time at which a user specifies to the computer an occurrence of an internal reorganization of the business organization;
   select the first financial data from the database at the second time;
   compare the first financial data with the second financial data to thereby determine
   whether the business organization has had a financial trigger, which corresponds to a financial change (FC) that exceeds a pre-determined threshold,
   wherein FC is calculated according to:

$$FC = \frac{\Delta Cashflow}{\Delta (Enterprisevalue / Investedcapital)}$$

where $\Delta$Cashflow corresponds to a change in the cash flow of a business organization over time and $\Delta$(Enterprisevalue/Investedcaptial) corresponds to a change in the ratio of the enterprise value of the business organization to the capital invested in the business organization over the same time;
   wherein if a financial trigger has occurred, the computer is further configured to add the business organization to data that defines a list of transformation candidates; and
   communicate the list of transformation candidates to a display device.

28. The system according to claim 27, wherein the information comprises financial information that further comprises at least one of: profitability and a profitability growth rate over time, revenue and a revenue growth rate over time, and cash flow and a cash flow growth rate over time.

29. The system according to claim 27, wherein the performance trigger corresponds to at least one of: a financial trigger, a market trigger, and an internal trigger, wherein the internal trigger corresponds to changes in internal conditions of the business organization.

30. The system according to claim 29, wherein the financial trigger corresponds to a decline in a growth rate of at least one of: the profitability and the cash flow.

31. The system according to claim 30, wherein the decline in the growth rate is at least 10%.

32. The system according to claim 29, wherein the market trigger corresponds to changes in market conditions that have an adverse effect on the business organization that has had the performance trigger.

33. The system according to claim 27, wherein the computer is configured to prioritize the list of transformation candidates.

34. The system according to claim 33, wherein a candidate that is most likely to benefit from a transformation is displayed at the top of the list of transformation candidates.

35. The system according to claim 33, wherein the prioritizing comprises:
   identifying a business unit within an identified business transformation candidate that results in a decline in a shareholder value;
   determining a reason as to why the identified business unit causes at least in part the decline in the shareholder value; and
   assessing a cost needed to transform the business transformation candidate to reduce the decline in shareholder value, where higher priority is given to transformation candidates that are most likely to benefit from a transformation.

36. The system according to claim 35, wherein locating comprises:
   determining actual costs of all investments for all business units within a transformation candidate, discounted to a present value, using a cost of capital associated with the identified business units;
   estimating an economic value of the identified business unit by discounting an expected cash flow to a present value; and
   calculating a difference between the estimated economic value and the determined actual costs.

37. The system according to claim 35, wherein the reason for the decline in shareholder value is determined by evaluating at least one of:
   1) a value gap between investor expectations and each transformation candidate's plans for shareholder value creation,
   2) whether investor expectations for future growth are low relative to industry peers,
   3) whether the transformation candidate's profitability is increasing over time,
   4) whether one or more entities within each transformation candidate suffers from declining revenues and lack of demand, and
   5) whether one or more entities of the transformation candidate suffers from poor competitive advantage due to cost or capital position.

38. A system for identifying and transforming a business organization, the system comprising:
   a computer configured to receive first financial data that defines a financial state of a business organization at a first time;
   store hardware configured to the first financial data to a database;
   receive second financial data that defines the financial state of the business organization at a second time that is later than the first time, the second time corresponding to one of: a fixed period after the first time, a time at which a user specifies to the computer an occurrence of a change in market conditions, and a time at which a user specifies to the computer an occurrence of an internal reorganization of the business organization;
   select the first financial data from the database at the second time;
   compare the first financial data with the second financial data to thereby determine
   whether the business organization has had a financial trigger, which corresponds to a financial change (FC) that exceeds a pre-determined threshold,
   wherein FC is calculated according to:

$$FC = \frac{\Delta Cashflow}{\Delta(Enterprisevalue / Investedcapital)}$$

where $\Delta Cashflow$ corresponds to a change in the cash flow of a business organization over time and $\Delta$(Enterprisevalue/Investedcaptial) corresponds to a change in the ratio of the enterprise value of the business organization to the capital invested in the business organization over the same time;
   wherein if a financial trigger has occurred, the computer is further configured to add the business organization to data that defines a list of transformation candidates;
   form a transformation plan for the business organization if the business organization has been added to the list of transformation candidates; and
   communicate the transformation plan to a display device to the transformation plan on a display a display device.

39. The system according to claim 38, wherein the computer is further configured to prioritize the list of transformation candidates so that candidates most likely to benefit from a transformation are given the highest priority.

40. A method for identifying a business organization that needs transformation, the method comprising:
   receiving, at a computer, first financial data that defines a financial state of a business organization at a first time;
   storing, by the computer, the first financial data to a database;
   receiving, at the computer, second financial data that defines the financial state of the business organization at a second time that is later than the first time, the second time corresponding to one of: a fixed period after the first time, a time at which a user specifies to the computer an occurrence of a change in market conditions, and a time at which a user specifies to the computer an occurrence of an internal reorganization of the business organization;
   selecting, by the computer, the first financial data from the database at the second time;
   comparing, by the computer, the first financial data with the second financial data to thereby determine
   whether the business organization has experienced a financial trigger, where a business organization has experienced a financial trigger when the following equation is true:

$$\frac{\Delta Cashflow}{\Delta(Enterprisevalue / Investedcapital)} > 10\%$$

where $\Delta Cashflow$ corresponds to a change in the cash flow of a business organization over time and $\Delta$(Enterprisevalue/Investedcaptial) corresponds to a change in the ratio of the enterprise value of the business organization to the capital invested in the business organization over the same time;
   if the a financial trigger has occurred, adding, by the computer, the business organization to data that defines a list of transformation candidates; and
   displaying on a display device in communication with the computer one or more business organizations in the list.

* * * * *